W. M. PARKISON.
TRANSMISSION GEARING.
APPLICATION FILED AUG. 31, 1908.

950,823.

Patented Mar. 1, 1910.
2 SHEETS—SHEET 1.

Witnesses
C. D. P. Brown.
C. H. Griesbauer.

Inventor
Wallace M. Parkison,
by D. H. B. Willson & Co.
Attorneys

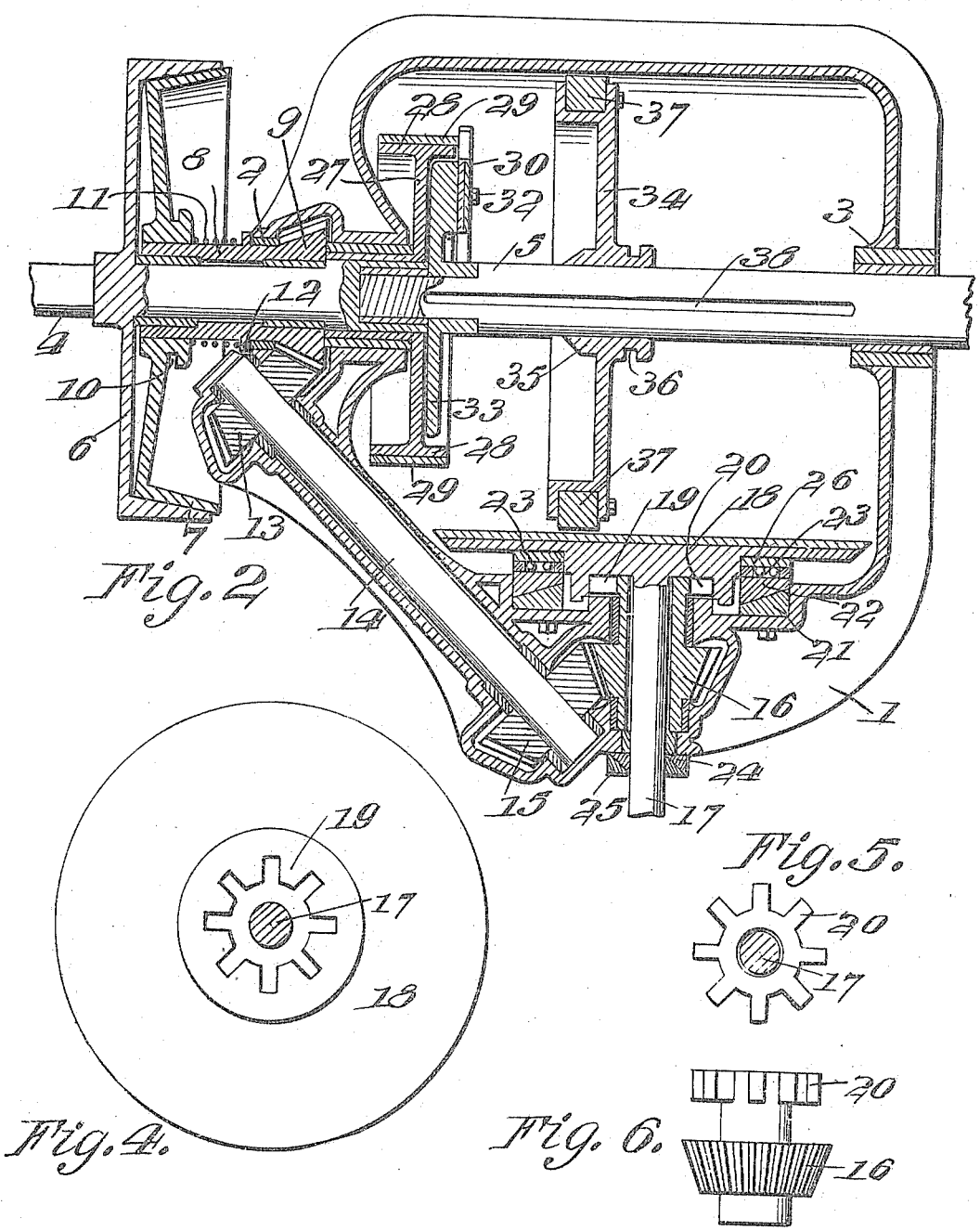

UNITED STATES PATENT OFFICE.

WALLACE M. PARKISON, OF BROOK, INDIANA, ASSIGNOR OF ONE-HALF TO WILLIAM H. PARKINSON, OF RENSSELAER, INDIANA.

TRANSMISSION-GEARING.

950,823. Specification of Letters Patent. Patented Mar. 1, 1910.

Application filed August 31, 1908. Serial No. 451,127.

*To all whom it may concern:*

Be it known that I, WALLACE M. PARKISON, a citizen of the United States, residing at Brook, in the county of Newton and State of Indiana, have invented certain new and useful Improvements in Transmission-Gearing; and I do declare the following to be a full, clear, and exact description of the invention, such as will enable others skilled in the art to which it appertains to make and use the same.

This invention relates to improvements in transmission gearing and is particularly designed to provide a simple gear mechanism for automobiles and similar vehicles.

One of the objects of the invention is to provide a transmission gearing with a drive and driven shaft and means for automatically locking the shafts when the driven shaft attains the same speed, or near the same speed, as the drive shaft.

Another object of the invention is the production of transmission gearing having a drive and driven shaft with means for manually regulating the speed of the driven shaft comprising a friction wheel slidably mounted on said shaft and means for automatically locking said driven shaft to the drive shaft when both shafts are of equal or near same speed.

Another object of the invention is the production of a transmission gearing having a drive and driven shaft and friction means for regulating the speed of the driven shaft and clutch means operated by the friction means for locking the drive and driven shaft together when the shafts are rotated at the same, or near the same speed.

A still further object of the invention is the production of a transmission gearing having a drive and driven shaft with friction means arranged to receive motion from the drive shaft by a similar gear arrangement.

With the foregoing and other objects in view, the invention consists of certain novel features of construction, combination and arrangement of parts, as will be more fully described and particularly pointed out in the appended claims.

Figure 1:
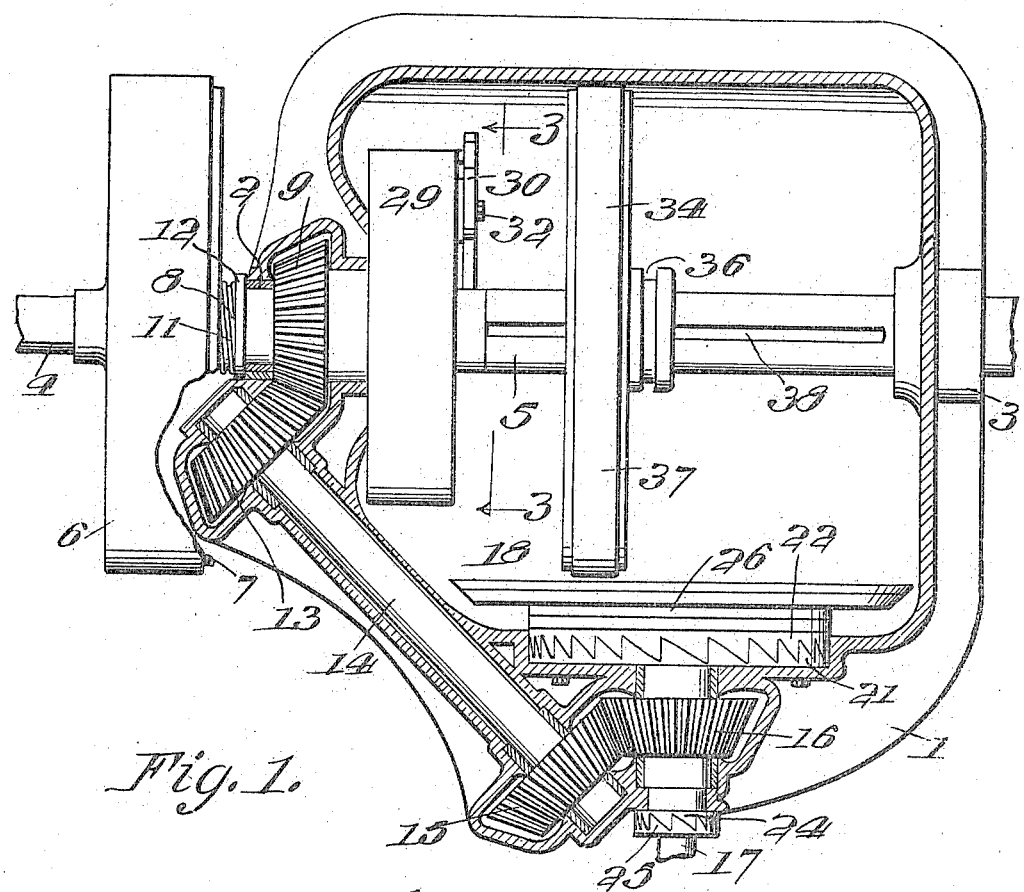
Figure 3:
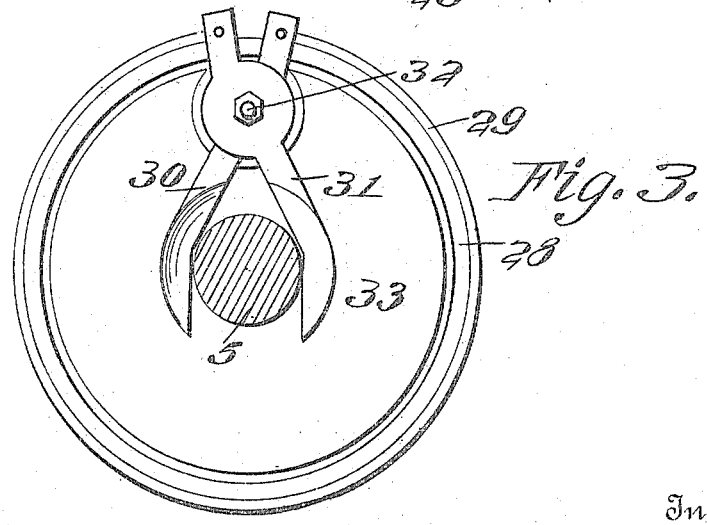

In the accompanying drawings, Figure 1 is a plan view of my improved transmission gearing; Fig. 2 is a horizontal section thereof; Fig. 3 is a vertical section taken on line 3—3 of Fig. 1; Fig. 4 is a bottom plan view of a friction wheel; Fig. 5 is a top plan view of a gear wheel; and Fig. 6 is a side elevation of said gear wheel.

Corresponding and similar parts are indicated in all of the views of the drawings and in the following description by similar reference characters.

In the drawings, numeral 1 designates the supporting frame formed with bearings 2 and 3. The drive shaft 4 extends through bearing 2 and is countersunk at its inner end to receive a reduced end of a driven shaft 5 which extends through bearing 3. The drive shaft 4 is formed with a clutch wheel 6, which is engaged by a second clutch wheel 7 and is slidably mounted on a sleeve 8. The sleeve 8 is formed at its inner end with a beveled gear 9 which rotates on shaft 4.

The hub of the clutch wheel 7 is formed with an annular groove 10 adapted to receive a spanner and a spring 11 is adapted to exert tension against said hub and against a collar 12 formed on the sleeve 8. The beveled gear 9 engages a second beveled gear 13 which is rigidly mounted upon a shaft 14 extending at an angle of approximately forty-five degrees to the shaft 4 and is rotatably mounted on the frame 1.

The shaft 14 is formed or provided with a third beveled gear 15 which is adapted to engage a similar gear 16 loosely mounted upon a friction wheel shaft 17. The shaft 17 is provided with a friction wheel 18 preferably faced with aluminum and is rotatable on the frame 1, and the friction wheel 18 is formed with lugs 19, which are regularly spaced apart to receive lugs 20 formed on the beveled gear 16. An annular cam 21 is rigidly bolted to the frame 1 and embraces the lugs 19 of the friction wheel 18, and said cam engages a second cam 22, which is formed with ball bearing grooves 23.

The cam 22 is provided with an operating handle not shown and is adapted to move in the arc of a circle against the cam 21 for the purpose of raising the friction wheel 18 on the frame 1. A second set of cams 24 and 25 are positioned around the shaft 17 and arranged to return the friction wheel 18 to its normal position when the same has been raised by means of the lifting cams 21 and 22. The friction wheel 18 is formed with ball bearing race-ways 26, arranged to register with race-ways 23 formed on cam 22.

The clutch wheel 27 is rigidly mounted on the shaft 4 and is formed with a rim portion 28, engaged by a contracting band 29. The contracting band 29 is connected to the pivotal members 30 and 31, which are pivotally secured by means of a bolt 32 to a second clutch wheel 33. The pivotal members 30 and 31 extend downwardly to opposite sides of the shaft 4 and are arranged to be engaged by a friction wheel 34 formed with a cone 35. The friction wheel 34 is formed with an annular groove 36, adapted to receive a spanner and is provided with a friction band 37 which may be formed of any suitable friction material.

The friction wheel 34 is adapted to engage the friction wheel 18 when said last mentioned friction wheel is raised by means of the operating cam 22 and the friction wheel 34 is loosely secured on the shaft 5 by means of a feather key 38. When the shaft 4 is rotated, the friction wheel 7 is brought into engagement with the friction wheel 6. The motion will be transmitted from shaft 4 to beveled gear 9 and by means of beveled gear 9 and beveled gear 13 to shaft 14, and by means of beveled gear 15 mounted on said shaft, and bevel gear 16 friction wheel shaft 17 will be rotated.

When it is desired to transmit motion from the friction wheel 18 mounted on the shaft 17, cam 22 is moved against cam 21 and said friction wheel is brought into engagement with friction wheel 34, thereby imparting a rotary movement to said friction wheel and to the shaft 5.

When it is desired to increase the speed of the driven shaft 5, the friction wheel 34 is moved by means of a spanner (not shown) across the face of friction wheel 18 and when the friction band 37 of friction wheel 34 engages the outer edge of friction wheel 18, shaft 5 will attain a speed approximately equal to the speed of shaft 4. As the friction wheel 34 is moved on the outer edge of the friction wheel 18, cone 35 of said friction wheel will engage with pivotal members 30 and 31 and friction band 29, which engages wheel 27, will be contacted, thereby locking shaft 5 to shaft 4.

Simultaneously with the locking of the shafts 4 and 5 by means of the contracting band 29, clutch wheel 7 may be moved out of engagement with clutch wheel 6 or beveled gear 13 moved out of engagement with beveled gear 9, and cam 25 moved against cam 24, thereby bringing friction wheel 18 out of engagement with friction wheel 34 and consequently preventing unnecessary wear of said friction wheels and waste of power.

At all times the friction wheel 18 bears against the ball bearings formed on cam 22 and said wheel may be controlled by any suitable equivalent for the cams, which are adapted to move said wheel into and out of engagement with friction wheel 34. The clutch mechanism for locking shafts 4 and 5 together as well as clutch mechanism 6 and 7 may be of any approved type and additional gears may be connected with the drive shaft 4 should the same be desired.

It will be seen that by means of my improvements, a positive friction drive is secured and an automatically controlled direct drive is secured with the drive shaft and the driven shaft attains the same or near the same speed as the drive shaft.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:—

1. A transmission gearing comprising a drive and a driven shaft, bevel gears connected with the drive shaft, means for transmitting motion from the bevel gears to the driven shaft and means for locking the drive to the driven shaft, said means adapted to be operated by the first mentioned means when the driven shaft attains a speed equal to or near the speed of the drive shaft.

2. A transmission gearing comprising a drive and a driven shaft, a clutch having connection with the drive shaft, a gear driven by the clutch, a secondary shaft driven by the gear, a friction wheel driven by the secondary shaft, a friction wheel slidably mounted on the driven shaft arranged to receive motion from the first mentioned friction wheel, and means for locking the drive to the driven shaft operated by the last mentioned friction wheel.

3. A transmission gearing comprising a drive and a driven shaft, gears for transmitting motion from the drive shaft, a clutch for connecting the gears to the drive shaft, a friction wheel arranged to receive motion from the gears, a second friction wheel mounted on the driven shaft arranged to receive motion from the first mentioned friction wheel, and means operated by the driven friction wheel for locking the drive and the driven shaft together.

4. A transmission gearing comprising a drive and a driven shaft, a beveled gear loosely mounted on the drive shaft, a clutch for connecting the beveled gear to the drive shaft, a second beveled gear driven by the first mentioned beveled gear, a shaft driven by the second beveled gear, a third beveled gear driven by the shaft, friction means driven by the third beveled gear for connecting said gear to the driven shaft, a friction wheel driven by the friction means, said wheel being mounted on the driven shaft and means for locking the driven to the drive shaft operated by the driven friction wheel.

5. A frame, a drive shaft mounted on the frame, a driven shaft mounted on the frame, a friction wheel movable with the driven shaft and slidable thereon, a second friction wheel supported on the frame and revoluble around an axis at right-angles to the axis of the driven shaft, gears for connecting the driven shaft to the second friction wheel, a clutch for connecting the drive and the driven shafts rigidly together, and cone means formed on the first mentioned friction wheel for actuating the clutch whereby the drive and driven shafts are locked.

6. A frame, a drive shaft mounted on the frame, a driven shaft mounted on the frame, a friction wheel movable with the driven shaft and slidable thereon, a cone formed on the friction wheel, a second friction wheel adapted to engage with the first mentioned friction wheel supported on the frame and revoluble around an axis at right-angles to the axis of the driven shaft, a clutch wheel mounted on the drive shaft, a contracting band clutch rotatably supported on the driven shaft and adapted to engage with the clutch wheel, said band clutch being arranged in line with the cone of the first mentioned friction wheel and adapted to be actuated thereby, means including gears for connecting the drive shaft with the second mentioned friction wheel and means for disconnecting the gears from the drive shaft.

7. A frame, a drive shaft mounted on the frame, a driven shaft mounted on the frame, a plurality of clutch members arranged on the drive shaft, means arranged on the drive shaft for holding the clutch members normally in engagement with each other, a bevel gear connected to one of the clutch members mounted on the drive shaft, a rod mounted on the frame, bevel gears on its opposite ends, one of said bevel gears being adapted to engage with the bevel gear connected with one of the clutch members, a bevel gear mounted on the frame arranged to engage with the other bevel gear of the rod, a friction wheel mounted on the frame connected with the last mentioned bevel gear, a friction wheel mounted on the driven shaft adapted to engage with the first mentioned friction wheel and means for disconnecting the clutch members and the gears from the driven shaft.

8. A frame, a drive shaft mounted on the frame, a driven shaft mounted on the frame in axial alinement with the drive shaft, a clutch wheel mounted on the drive shaft adjacent to the end of the driven shaft, a band clutch arranged to engage the clutch wheel of the drive shaft, a pair of clutch band supporting and contracting members, pivotally supported on the drive shaft and connected with the ends of the clutch band, a friction wheel formed with a spreader cone adapted to spread the free ends of the clutch supporting members and cause the clutch band to contract and engage the clutch wheel, a second friction wheel adapted to engage the first mentioned friction wheel, means including gears for transmitting motion from the drive shaft to the second friction wheel, and a clutch arranged on the drive shaft for connecting the gears to said shaft.

9. A transmission gearing, comprising a drive and a driven shaft, a clutch having connection with the drive shaft, a gear driven by the clutch, a secondary shaft driven by the gear, a friction wheel driven by the secondary shaft, a second friction wheel slidably mounted on the driven shaft and arranged to receive motion from the first mentioned friction wheel, and means for locking the drive to the driven shaft.

In testimony whereof I have hereunto set my hand in presence of two subscribing witnesses.

WALLACE M. PARKISON.

Witnesses:
FRED LONGWELL,
FRANK DAVIS.